C. E., J. & S. WETHERED.
Drying Apparatus.
No. 11,143.
Patented June 20, 1854.
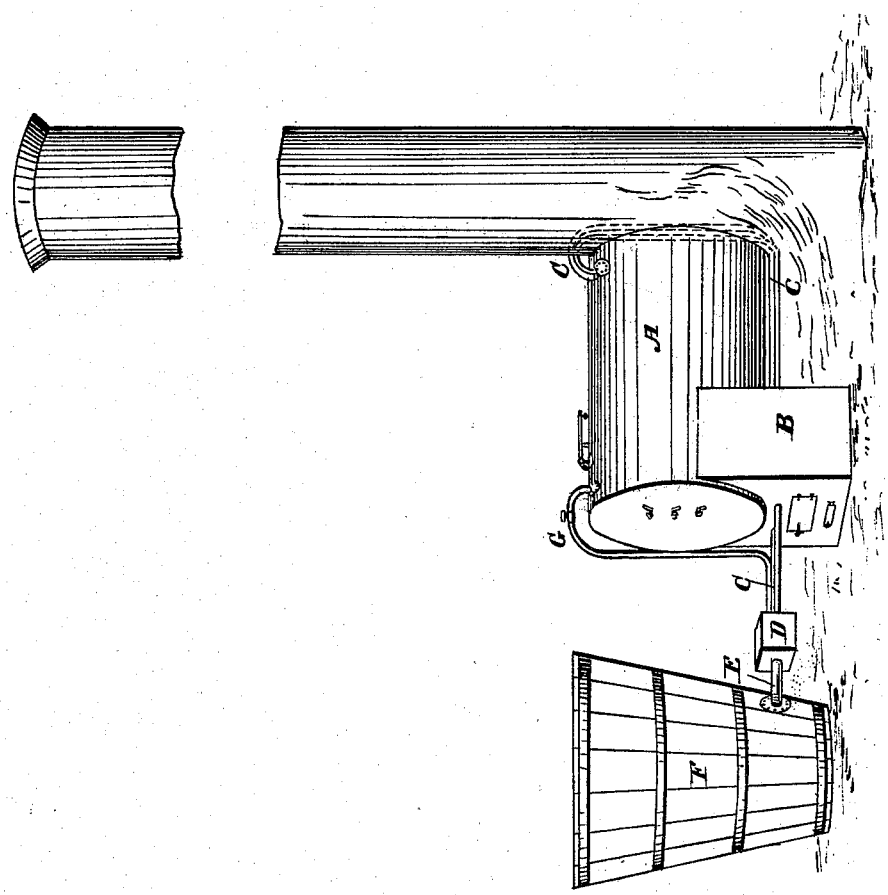
Witnesses:
Inventors:

UNITED STATES PATENT OFFICE.

CHARLES E. WETHERED, JOHN WETHERED, AND SAMUEL WETHERED, OF BALTIMORE, MARYLAND.

APPLICATION OF ORDINARY AND SUPERHEATED STEAM COMBINED FOR HEATING PURPOSES.

Specification forming part of Letters Patent No. 11,143, dated June 20, 1854.

*To all whom it may concern:*

Be it known that we, CHARLES E. WETHERED, JOHN WETHERED, and SAMUEL WETHERED, of Baltimore, Maryland, have invented a new and useful Improvement in the Application of Steam for the Purpose of Boiling or Evaporating, Drying, Melting, and Heating, which we desire to secure by Letters Patent; and we do hereby declare that the following is a full and exact description of our said improvement.

We attach to the space in the boiler occupied by the steam two or more pipes, one passing directly to or into the liquid to be boiled, evaporated, or substance to melted or heated, and the other or others passing through the furnace, either directly, also to or into the liquid to be boiled or evaporated or substance to be melted or heated, or in the usual steam-pipe before it enters, or at its entrance into the boiling, evaporating, or melting cistern or kettle, or pipes for heating, or into a common reservoir into which both pipes discharge themselves and between which and the cistern or pipes for heating there is a pipe of communication, or the superheated pipe may be inclosed within the regular steam-pipe after the former leaves the furnace, or the steam-pipe may be inclosed within the superheating-pipe. The steam passing through the first of the above-mentioned pipes is that ordinarily used for boiling or evaporating, drying, melting, or heating. The steam passing through the pipe or pipes which in their turn pass through the furnace and becoming dried or heated in its passage is converted into what is known as "superheated" or "surcharged" steam of a much higher temperature than that which passes directly to the boiling or evaporating kettle or cistern.

In the experiments we have made we found that the steam entered the liquid to be boiled or evaporated at from 212° to 240° Fahrenheit, and that when we combined the superheated steam at a temperature of from 500° to 600° Fahrenheit with the ordinary steam we were enabled to boil the liquid in less than half the time than when we used steam alone, thereby saving more than half the fuel.

What we claim as new, and desire to secure by Letters Patent, is—

The application of the combination of ordinary steam and superheated steam, which combination is effected by bringing them together in pipes of any convenient form before or at the point where their contents are discharged, for the purposes of boiling, evaporating, drying, melting, and heating.

CHAS. E. WETHERED. [L. S.]
  JNO. WETHERED. [L. S.]
  SAMUEL WETHERED. [L. S.]

Witnesses:
 SAML. D. TOY,
 JOHN N. STINCHCOMB.